Figure 5:
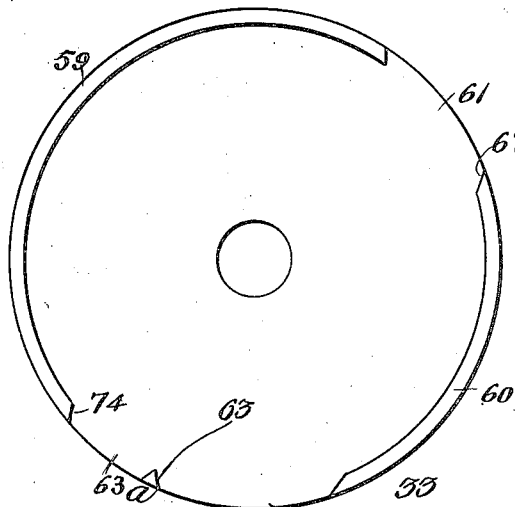

L. W. LUELLEN.
DISPENSING APPARATUS.
APPLICATION FILED NOV. 22, 1909.
1,081,508.
Patented Dec. 16, 1913.
6 SHEETS—SHEET 1.
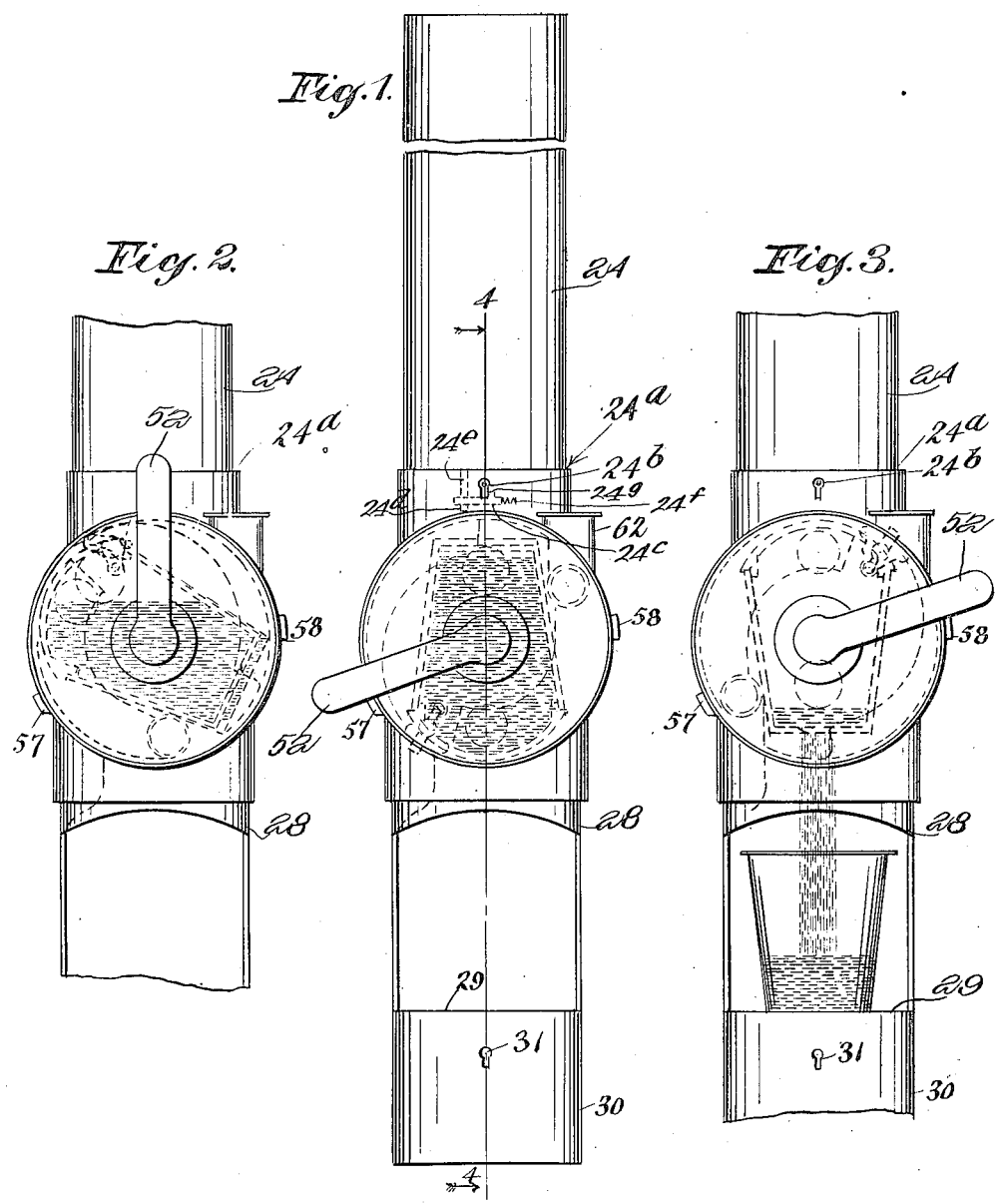

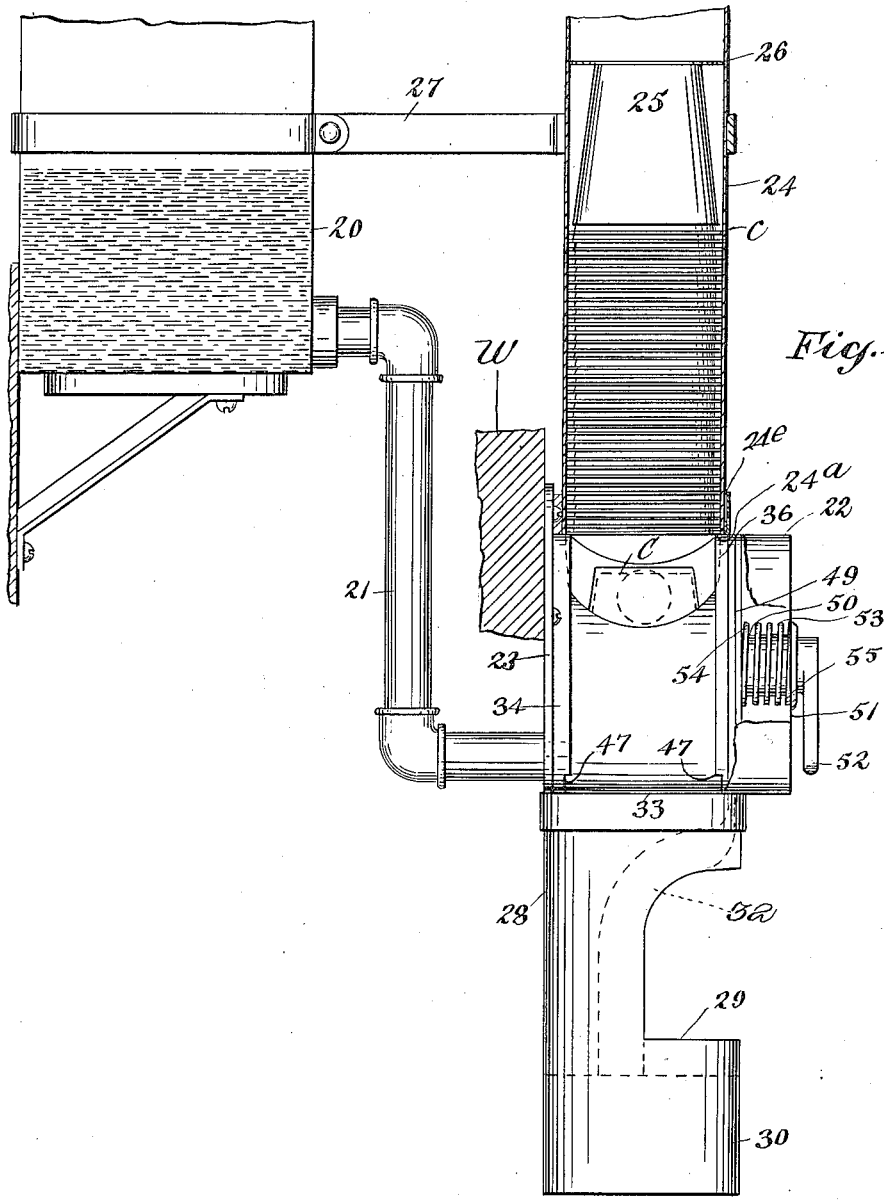

L. W. LUELLEN.
DISPENSING APPARATUS.
APPLICATION FILED NOV. 22, 1909.

1,081,508.

Patented Dec. 16, 1913.
6 SHEETS—SHEET 3.

Witnesses:
L. B. Weymouth.
Joseph A. Gately

Inventor:
Lawrence W. Luellen
by Sylvanus H. Cobb
Atty.

L. W. LUELLEN.
DISPENSING APPARATUS.
APPLICATION FILED NOV. 22, 1909.
1,081,508.
Patented Dec. 16, 1913.
6 SHEETS—SHEET 4.
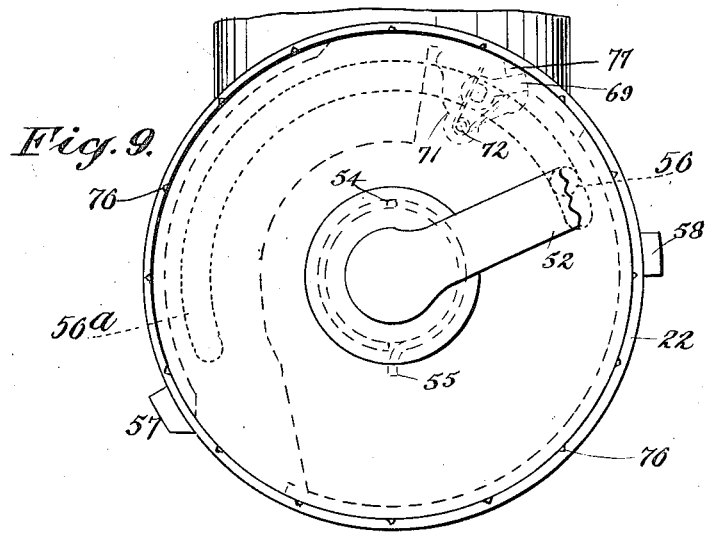
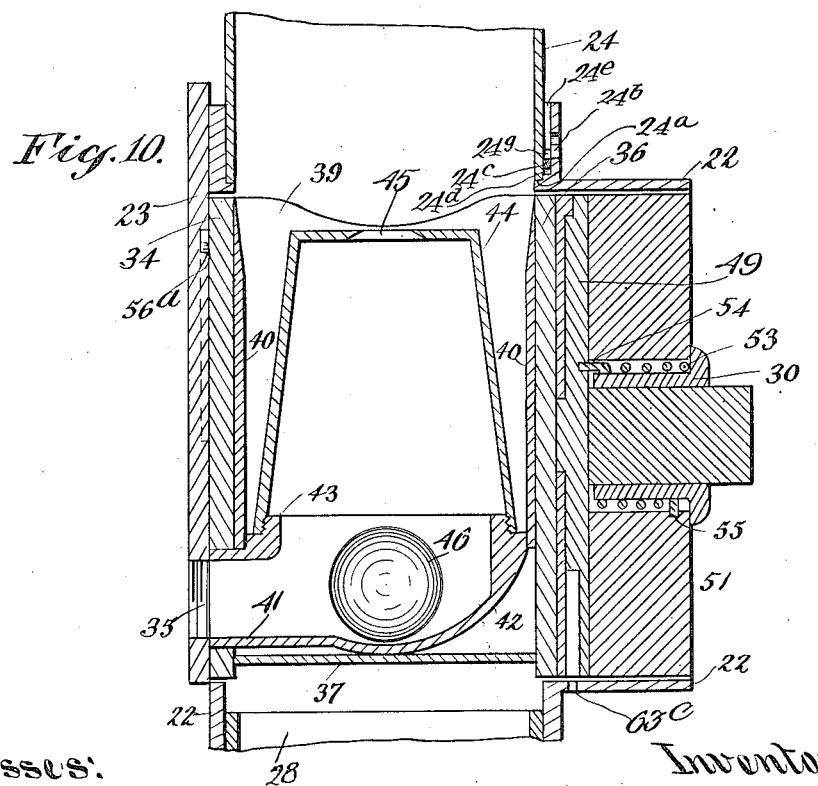
Witnesses:
L. B. Weymouth.
Joseph A. Gately
Inventor:
Lawrence W. Luellen
by Johannes H. Cobb
Atty L. W. LUELLEN.
DISPENSING APPARATUS.
APPLICATION FILED NOV. 22, 1909.
1,081,508.
Patented Dec. 16, 1913.
6 SHEETS—SHEET 5.
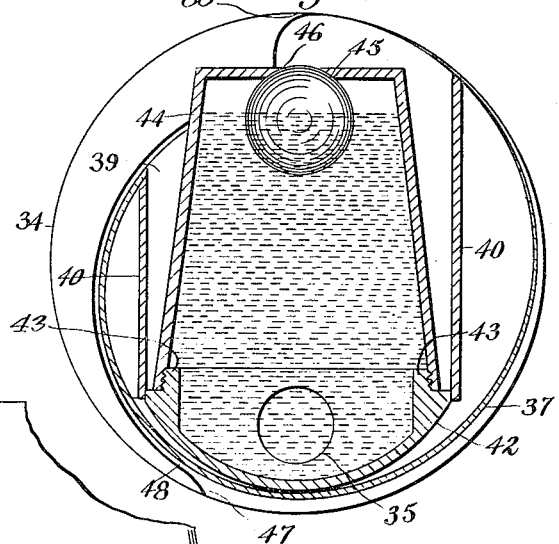
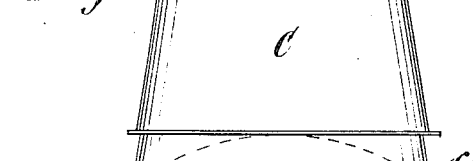
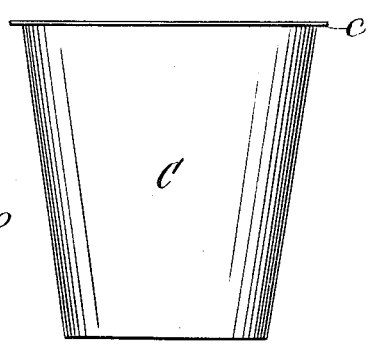
Witnesses:
L. B. Weymouth.
Joseph A. Gately
Inventor:
Lawrence W. Luellen
by Sylvanus H. Cobb.
Atty.

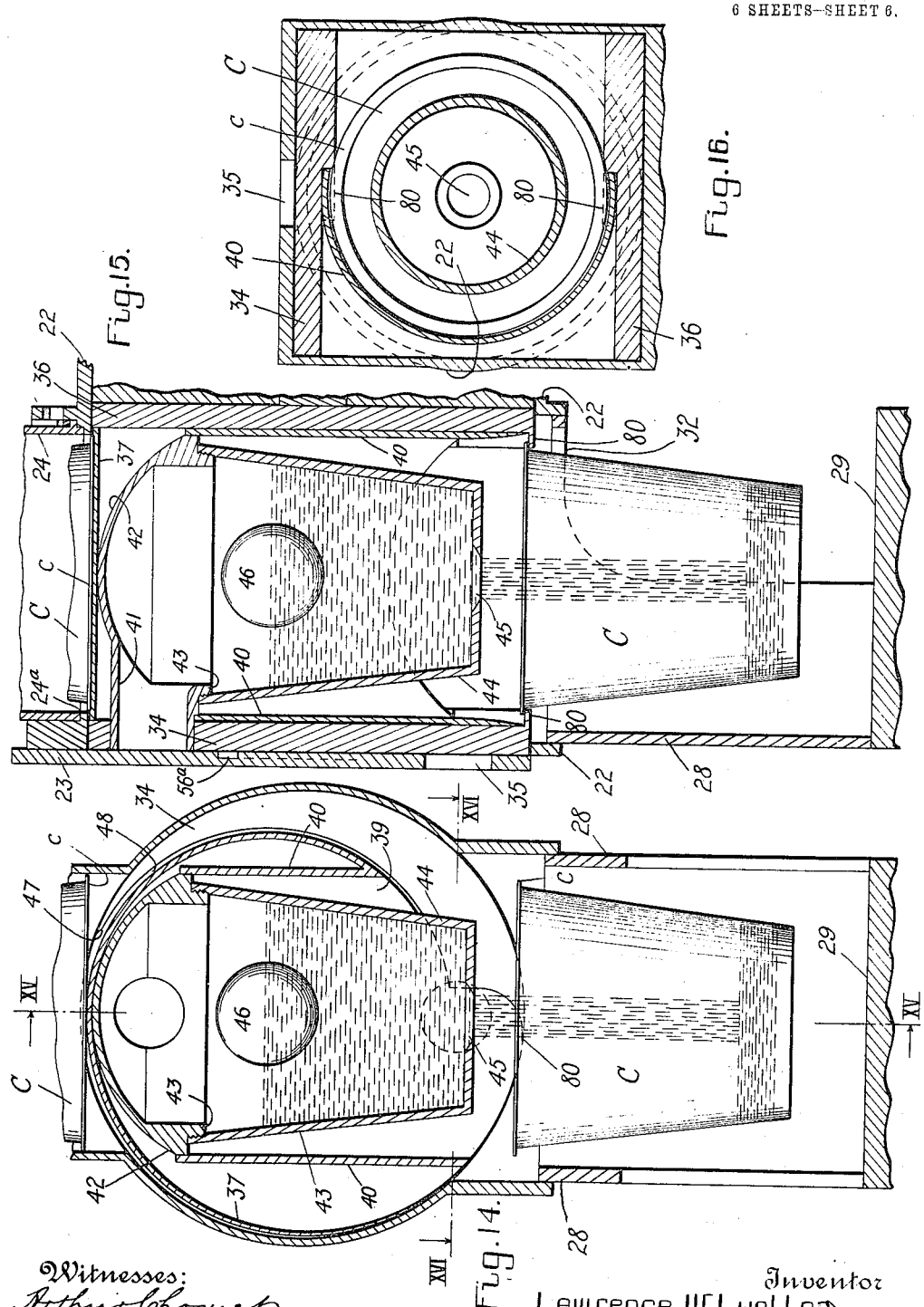

UNITED STATES PATENT OFFICE.

LAWRENCE W. LUELLEN, OF NEW YORK, N. Y.

DISPENSING APPARATUS.

1,081,508.  Specification of Letters Patent.  Patented Dec. 16, 1913.

Original application filed April 2, 1908, Serial No. 424,732. Divided and this application filed November 22, 1909. Serial No. 529,206.

*To all whom it may concern:*

Be it known that I, LAWRENCE W. LUELLEN, a citizen of the United States, residing at New York, borough of Manhattan, in the county and State of New York, have invented a new and useful Dispensing Apparatus, of which the following is a specification.

My invention relates to apparatus for dispensing merchandise, and more especially to those for delivering a cup or other fluid container.

The principal objects of the invention are to provide a simple and efficient apparatus for this purpose, in which the container is withdrawn from a supply thereof, so stored as to be guarded against the accumulation of dirt.

Cups or other liquid containers which are to be dispensed from an automatic dispensing apparatus must necessarily be stored within the apparatus in considerable numbers and in order that this may be accomplished without unduly enlarging the apparatus it is a matter of great practical advantage if not of absolute necessity to nest the cups one within the other. The delivery of nested articles, however, presents certain difficulties not met with in dispensing merchandise of other forms; for example, it is obviously impractical to remove a cup from a stack of nested cups by any device operating to slide the cup laterally of the stack, as is done with ordinary articles of merchandise in a large class of dispensing devices operating on that principle. The delivery of articles from a stack of nested articles requires, as a first step at least, the longitudinal movement of the article from the stack. Another difficulty which is present in handling nested articles, particularly where they are of considerable size and very light, as in the case of paper cups, is that the articles in the stack tend to stick together, either by being wedged into each other, or by reason of surface adhesion, or for other cause. In the case of paper cups, I have found that this sticking together of the cups is sufficient to prevent the delivery of the cups simply by gravity, but that it is necessary to positively withdraw the terminal cup from the stack or at least to positively separate or loosen it from the stack sufficiently to free it therefrom or to give it a start, so as to permit it to fall freely away from the same by gravity.

My invention provides means for thus separating or loosening the individual cups from the stack so as to permit their individual delivery and so far as I am aware, I am the first to produce mechanism operating on this principle.

My invention in its preferred form also provides means for supporting the stack of cups or other articles so as to permit removal of a terminal cup or cups by engagement with the exposed portion of a cup or cups; means for delivering or rendering accessible the cups when separated from the stack; means for inverting the cups before delivery in cases where the cups are so arranged in the stack that they would otherwise be delivered in an inconvenient position for use, and certain other improved constructional and operative features, the nature of which will appear from the following detailed description.

In the accompanying drawings is illustrated one embodiment of my invention in connection with a machine for vending the cup filled with a liquid.

Figure 6:
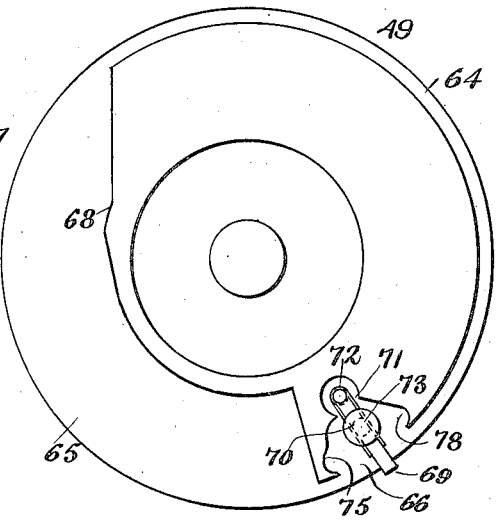
Figure 7:
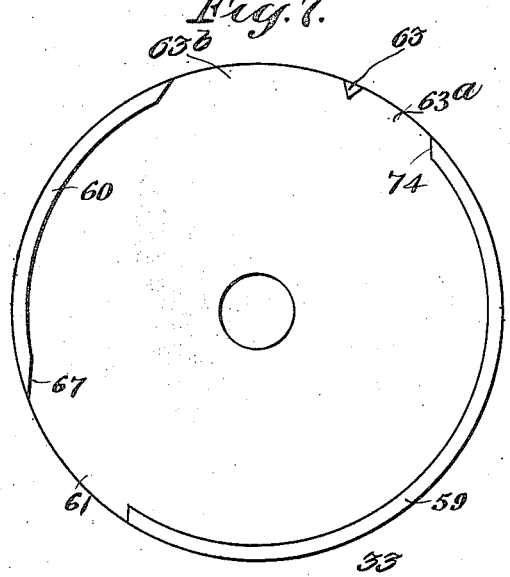
Figure 8:
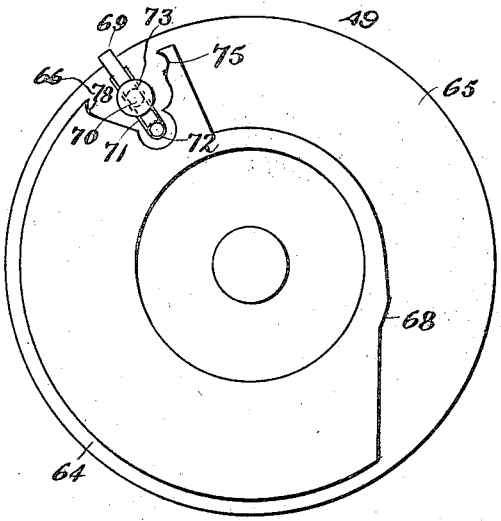

Here Figure 1 shows a front elevation of the improved machine; Figs. 2 and 3 are similar views with parts broken away, showing successive positions of the delivery-drum; Fig. 4 is a partial section on the line 4—4 of Fig. 1; Figs. 5 and 6 illustrate the opposing faces of the delivery-drum and its actuating disk, respectively, these being represented in their normal position; Figs. 7 and 8 are similar views with the elements at their opposite extremity of movement; Fig. 9 is a front elevation of the casing, parts being broken away, illustrating the return of the drum to its initial position under the influence of the actuating disk; Fig. 10 is a central vertical longitudinal section through the casing; Fig. 11 is a transverse section through the center of the delivery-drum; Fig. 12 is a partial section through the drum showing the manner in which it engages the cups; Fig. 13 is a side elevation of one form of cup which may be used with dispensing apparatus embodying my invention; Fig. 14 is a vertical central section through the casing and the delivery drum showing the latter inverted to discharge a cup and showing the cup temporarily supported by the drum prior to its deposit upon the supporting shelf or its removal by the purchaser; Fig. 15 is a vertical transverse section of the parts shown in Fig. 14 taken upon the line XV—XV of Fig. 14; Fig. 16 is a sectional plan view taken on line XVI—XVI of Fig. 14, showing the lower part of the drum with the cup hanging therefrom.

Similar characters designate like parts throughout the several figures of the drawings.

I have shown my improved apparatus supported in proximity to a merchandise-receiver 20, which, in the present instance, consists of a tank or reservoir for liquid, and has an outlet-passage furnished by a pipe 21 communicating with an opening in the rear wall of a casing 22. In the particular form of the invention illustrated, this casing carries the other elements of the apparatus, is cylindrical, and is situated with its axis extending horizontally. It may be supported in any suitable manner, for instance by being secured to the reservoir or to an intermediate wall, as shown at W, by a flange 23 through openings of which screws or bolts pass into the wall.

At the top of the casing is an opening having about it a flange or member 24ª forming a socket in which rests the lower extremity of a vertical receiver 24, preferably of tubular form, for a supply of merchandise-containers. The receiver may be secured in the socket by a lock 24ᵇ which may be of any suitable construction. The mechanism of the lock is illustrated diagrammatically as comprising a sliding bolt 24ᶜ adapted to engage a lug 24ᵈ on the receiver and retain the same in a vertical slot 24ᵉ in the wall of the socket. The bolt is normally held in locking position by a spring 24ᶠ and is provided with a lug 24ᵍ adapted to be engaged by a suitable key by which the bolt may be retracted. The specific construction of the lock constitutes no part of my invention and obviously may be modified as may be found expedient. When the apparatus is to be used for the dispensing of liquid the containers will consist of cups C, of any suitable form and construction, preferably of the ordinary frusto-conical type and of some light material such as paraffin or other water-proof paper. Each cup preferably has adjacent to its open end a suitable projection furnished in the particular form of cup illustrated by an annular flange c. The provision of flanges or other projections on the cups is not, however, essential in all cases, and plain cups may sometimes be used. The supply of cups is placed in the receiver in a closely nested series, the flanges being separated from one another by comparatively small spaces. In the preferred form of apparatus illustrated, the cups are placed with their open sides down, as this keeps dust from settling in them and also permits the stack of cups to be more firmly supported, as the lower edge of the bottom cup of the stack may be caused to normally rest directly upon the supporting means and it is unnecessary to rely for the support of the stack of cups upon means engaging the projections upon the cups or the exposed side portions of a cup. The inverted arrangement of the cups is not, however, essential and in some cases the cups may be otherwise placed in the apparatus. The cups are supported at the bottom of the receiver in a manner which will later be made clear. To insure the downward movement of the cups, as they are delivered one by one, the series is preferably weighted by a follower 25, which is cup-shaped and which fits upon the upper cup of the series. The follower has at its outer or smaller extremity a flange 26 fitting the bore of the receiver, whereby the stack is prevented from being deflected laterally. The use of a follower is, however, in many cases found unnecessary and may be dispensed with. As an auxiliary retaining means for the apparatus I have shown a stay 27 extending from the reservoir and embracing the cup-receiver.

Below the casing, in alinement with the receiver, is a cup-support and a coin-box furnished by a depending cylindrical extension 28, having at a suitable distance beneath the casing a shelf 29, about which is an opening of sufficient size to permit a cup to be removed therefrom. The coin-box 30 is at the end of the extension and is removable, having a lock 31 which secures it in place. Extending from a slot in the top of the coin-box and along the wall of the portion 28 is a coin-chute 32, which at its upper end communicates with the casing.

Mounted in or upon the casing 22 is mechanism for withdrawing, separating or releasing the terminal cup or cups from the stack and preferably also means for delivering or rendering accessible the cups so separated or released. In the preferred form of the invention illustrated, the cup separating or releasing mechanism and the cup delivering mechanism constitute portions of a single movable member and this construction is of great advantage as it results in the utmost simplicity of construction, but as will be understood, these two mechanisms are functionally distinct and need not be in any way connected. In fact, no delivery mechanism whatever is essential, as the structure of the device may be such as to render a cup accessible to the purchaser just as soon as it has been separated or withdrawn from the stack by the separating or releasing mechanism. In the form of the invention illustrated the combined separating or releasing means and delivery device or member which in the present instance also supplies a measured charge of liquid to the cup comprises a generally cylindrical drum 33, through the inner end wall 34 of which is an inlet-opening 35 normally registering with the discharge opening of the pipe 21 and operating, when the drum is turned, as a valve controlling the flow from the reservoir. Between the rear wall of the drum and its front wall 36, both of which walls or heads have at their edges a bearing upon the interior of the casing, is a side wall 37 curved gradually inward and therefore giving a surface eccentric to the axis. In the side of the drum, between the separated ends of the wall 37, is a recess or pocket 39 of considerable size having a cylindrical side wall 40, and at the bottom a bowl-like member 42 connecting the heads of the drum and communicating at one side through an extension 41 with the inlet opening 35. The member 42 has at its top an opening about which, projecting into the pocket, is a threaded flange 43, and upon this flange is screwed a hollow holder 44 similar in its general shape to one of the cups, and in its normal position the holder is in alinement with the cup receiver.

The bowl and holder together serve as a liquid or merchandise delivery receptacle having a definite capacity. The liquid entering the receptacle through the opening 35 is restrained from flowing through a discharge-opening or passage 45 situated at the center of the outer wall of the holder by a valve member 46 of buoyant material, preferably of rubber, in the form of a hollow sphere which floats upon the surface of the liquid within the receptacle and as said liquid rises seats itself against the opening. The integrity of the closure increases with the pressure and remains effective after the holder has been turned through a considerable angle, say of ninety degrees or more from the vertical.

The length of the drum and the thickness of its heads are such that the inner edges of the latter extend below the cup-receiver 24 at each side. Therefore, the lower or terminal cup of the series is supported by the contact of its flange c with the heads. At points 47 the heads narrow so that the cup-flanges may pass between them in a certain position of the drum, and when this occurs said flanges may enter opposite grooves 48, 48 in the heads, these grooves following the outer portion of the curved wall 37 and extending over the pocket 39. The grooves therefore diverge from the edges of the heads, which are concentric to the axis, and their outer walls furnish cam members, which by their engagement with the flanges c serve to withdraw the cups one by one from the series, as will later be made plain.

For imparting the desired oscillatory movement to the delivery drum any suitable actuating device may be employed. This may include coin controlled mechanism, although obviously, if the intention is to dispense cups without charge, such mechanism will be omitted. In the form of the invention illustrated, the delivery drum is actuated as follows: Coöperating with the end of the drum, though capable of independent movement, is an actuating disk or member 49, fitting the casing to rotate therein, and having a central spindle 50 extending through an opening in a plate 51 which closes the front of the casing. Secured on the outer extremity of the spindle is a handle or lever 52, the manipulation of which effects the operation of the delivery device. Between the disk 49 and the plate 51 is a chamber in which is situated a spring 53, here shown as of the spiral type attached at 54 to the disk and at its opposite end 55 to the plate. The spring is adapted to exert both expansive and torsional stresses, the effect of the first being to force the rear wall of the drum into close contact with the opposite wall of the casing, these being preferably ground to a fit, and thus guarding against leakage into the casing from the delivery-pipe. By its torsion the spring holds the disk and drum in their inactive positions and returns them after each operation. The correct limit of movement of the drum in each direction is assured by a device which may consist of a pin 56 projecting from the head 34 of the drum into a segmental slot $56^a$ formed in the rear wall of the casing. The position of the ends of the slot is such that the contact of the pin with them prevents the rotation of the drum beyond the proper position of rest or the extreme position for delivery. The travel of the actuating disk is also limited by stops 57 and 58 carried by the outer end of the casing for coöperation with the handle, and determining, respectively, the normal position under the tension of the spring 53 and the ultimate position for delivery under the manipulation of the operator.

Between the adjacent faces of the drum and actuating disk are means for controlling the rotation of the drum, by connecting it to the disk through a coin to secure the delivery movement and by pawl mechanism or the like to provide for the return movement. Upon the outer face of the head 36 of the drum is a peripheral flange divided into two sections 59 and 60. Between adjacent ends of these flanges is a space 61, which while the parts are at rest, with the lever against the stop 57, lies opposite the coin-ingress slot formed in the wall of the casing at the end of a receiving tube 62. The size of the tube is such that it will just admit the coin by which it is desired the machine shall be operated. Between the opposite extremities of the flanges 59 and 60 is a space divided by a projection 63 into two portions 63ᵃ and 63ᵇ. The space 63ᵃ normally registers with the coin-egress slot through the casing at the top of the chute 32, and at the same time the space 63ᵇ is alined with a casing-slot 63ᶜ located above the shelf 29. In the adjacent face of the actuating disk is a peripheral recess 64 to receive the flange 59, and a wide space 65 furnishing a channel connecting the coin-ingress openings with the slot 63ᶜ. When a coin of the correct size is introduced into the tube 62, it falls into the mouth of the channel between an end 67 of the flange 60 and a shoulder 68 upon the disk and is there retained, furnishing means for locking the disk to the drum when the handle is moved forward. The sectional dimensions of the channel formed by the space 65 are sufficient below the shoulder 68 to allow anything smaller than the proper coin to pass freely through it and fall upon the shelf. There is also in the disk, between the spaces 64 and 65, a small recess 66 in which is mounted a reversible detent 69, pivoted at 70 and yieldably held in a central or radial position by a double spring 71. This spring is fixed to a pin 72 at the inner side of the recess and has two arms resting against opposite squared surfaces 73 of the pivot or some other cylindrical element rotatable with said detent. The end of the detent may project beyond the drum and disk through the space 63ᵃ when opposite either coin-opening in the casing, but at other times it is prevented from assuming this radial position by contact with the casing wall. In the forward movement of the disk 49, when a coin engages the surfaces 67 and 68, the end of the detent rides upon the wall of the casing, the distance of the wall 75 of the recess 66 from the detent being sufficient to permit this, and coöperates with a series of angular depressions 76 formed in the wall and being equivalent to a set of ratchet teeth. The disk is thus held from returning to its initial position until the delivery movement has been completed and the detent allowed to straighten itself in the ingress-slot. At such time, upon the release of the handle, the spring 53 urges the disk back and the detent is reversed by contact with the projection 63. Now, however, it is unable to withdraw itself beneath the flange on account of the position of the wall 78 of its recess. This holds the end of the detent into the path of the projection and the engagement between these two members results in the restoration of the drum to its original position with the disk.

Let us suppose that my improved dispensing apparatus is to be employed for vending a cup filled with spring-water, for which a charge of one cent is to be made. The size of the tube 62 is therefore such that a cent will just enter it. When the machine is at rest (Figs. 1, 5, 6 and 11) the inlet opening 35 admits water from the reservoir to the delivery-receptacle, but this is kept from flowing through the opening 45 by the ball 46. Assuming that the machine has been previously operated, a cup C will be already seated upon the holder 44, and the lower one of the nested series in the receiver 24 will have its flange resting upon the concentric edges of the drum-heads (Fig. 4). A person desiring to secure a cup of water inserts a cent in the receiving tube and turns the handle in a clockwise direction. The first few degrees of movement brings the cent into engagement with both the surfaces 67 and 68, then the parts travel as a unit, the disk driving the drum through the interposed coin. The first effect of the rotation of the drum, as the opening 35 passes out of alinement with the delivery-pipe, is to cut off the feed of water, leaving in the receptacle the quantity which is to be dispensed. The ball tends to cling to the opening 45 for some time after the holder has left its vertical position, but after the cup has been revolved through about ninety degrees the ball will begin to free itself (Fig. 2), and the water flows slowly into said cup. As the holder approaches its lowest point (Fig. 3), at which the handle is against the stop 58, the cup is inverted with respect to its original position upon the holder and brought over the opening from the casing above the shelf. The cup now drops from the holder and falls to the position shown in Figs. 14, 15 and 16, where its flanges catch upon the projections or flanges 80 formed upon the inner walls of the drum heads, in line with the cup holder 44. This engagement affords sufficient support to retain the cup in the position shown in Figs. 14, 15 and 16 until some further force is applied to it. Where the cup is filled with liquid from the opening 46 in the cup holder, as in the particular embodiment of the invention illustrated, the weight of the water running into the cup soon reaches a point where it becomes sufficient to cause the cup to drop upon the shelf 29, but if the device is utilized for delivering cups only, the cup will ordinarily hang with its end projecting out of the opening in the bottom of the casing until it is grasped by the purchaser and removed. In such cases it will be seen that if desired, a shelf or other support for the cup may be dispensed with. In the particular device illustrated where the cup is automatically filled with liquid, it drops to the shelf when partly filled, as before stated, the delivery of the water being completed while the cup is falling and immediately after it reaches the shelf. If at any time during the advance movement of the handle the operator releases it or presses it back, the detent cooperating with the same one of the casing depressions 76 holds the parts against rearward travel. The delivery of the cup and contents having been completed, the handle or operating member is released and the torsional stress of the spring 53 becomes effective and rotates the disk left-handedly. This frees the coin from its engagement with the drum-flange and disk-shoulder, and now being opposite the chute 32 it falls therethrough into the box 30. The detent has passed into the tube 62 and there assumed its radial position (Figs. 3, 7 and 8). The movement of the disk continuing, the detent, held outside its recess by the wall 78, strikes the projection 63 (Fig. 9) and returns the drum to its initial position. As this reverse movement is taking place the flange of the lowermost cup of the stack contained in the receiver, and which is next to be transferred to the shelf, is located between the narrow portions of the drum-heads and is caught by the eccentric grooves 48, while the next cup of the series rides upon the wider portions of the heads (Fig. 12). The divergence of the grooves and edges of the heads draws the terminal cup downward and separates it from its companions, and when the pocket reaches the cup the grooves have cleared it and it drops into place upon the holder. Any tendency to resist disengagement is overcome by a slight blow given to the cup flange by the advancing rear portion of the pocket-wall 40. The machine is now ready for another operation.

It will be noted that the pocket is presented beneath the cup receiver or magazine at the time when the rotatable drum reaches the limit of its reverse movement, so that the drum stops with the pocket in position to receive the cup and remains in such position until the device is again operated to dispense a cup. By reason of this arrangement the cup pocket stands in position to receive a cup for a reasonable period of time in every case, so that the cup has ample time to drop into the bottom of the pocket where it will not interfere with the movement of the drum and will not be injured by striking any stationary part of the casing. Where the cups are light, as when made of paper, it is important to provide full opportunity for them to drop into the cup receiving pocket in this manner, as owing to their displacement of air, particularly where they fall through a confined chamber, an appreciable period is required for this operation.

Another characteristic of my invention to be noted is that the cup delivery member and the means for separating a cup from the stack are operated at the same time. This is obviously an advantage, as it permits a common operating handle or device to be employed and permits all of the steps necessary for the movement of a cup from the stack to the place of delivery to be performed by a single continuous movement of the operating handle or device. My invention in its preferred form accomplishes this result by providing for the release of a cup from the stack during the cycle of movements of the delivery mechanism in effecting the delivery of the previously released cup, devices being provided for supporting the cup when separated until such time as the delivery mechanism is ready to receive it for delivery. In the particular embodiment of my invention illustrated, it will be seen that during each oscillation of the delivery member over and back to invert a cup contained in the pocket thereof and discharge the same, the next succeeding cup of the stack is separated from the stack by reason of the engagement of its flange with the grooves 48, such separated cup being, however, supported by the curved surface 37 until the delivery member has returned to the initial position in which the cup can fall into the pocket.

If the handle of the machine is moved without a cent having been supplied to the slot 62, the actuating disk merely has an idle movement, the delivery-drum remaining stationary and the detent sliding over the inner face of the flange 59. As this prevents the detent from engaging the depressions 76, the disk is at once returned by the spring 53 from any position at which it may be released.

While I have, in the present instance, described my improved cup-dispensing apparatus as adapted for control by a coin and in connection with means for dispensing other merchandise, it is to be understood that these features, made, in part, the subjects of my applications Serial No. 450,037, filed August 24, 1908 and Serial No. 424,732, filed Apr. 2, 1908, are not essential to this invention. The present application is a division of said application, Serial No. 424,732.

It is to be understood that I have described in the foregoing specification in detail and shown in the drawings but one preferred embodiment of my invention in order to illustrate the principle thereof and the best mode now known to me for embodying such principle; but I do not thereby intend to limit myself to such specific embodiment, but desire and intend to cover the principle of my invention broadly in whatever particular mechanism it may be embodied.

Having thus described my invention I claim:—

1. A dispensing apparatus comprising a receiver adapted to contain cups with their open sides downward, and delivery means adapted to successively engage said open sides and invert the cups.

2. An apparatus for dispensing flanged cups comprising a receiver for a series of said cups, and a delivery member provided with a withdrawing surface for engagement with one face of a cup-flange and with a supporting surface for engagement with the opposite face of a flange.

3. A dispensing apparatus for nested cups comprising means for storing a series of cups in nested relation, means for withdrawing the terminal cup from the nested series and movable means for supporting the companion cups.

4. A dispensing apparatus comprising means for storing a series of cups, and a movable member having a surface for withdrawing a terminal cup from the series and a surface for supporting the companion cups, said surfaces diverging from one another.

5. The combination with a cup receiver for holding a series of nested cups, of a delivery member provided with a cup recess, and means for separating a terminal cup from said series and dropping said cup into said recess.

6. The combination with a cup-receiver, of a rotatable delivery member having at one side a recess and adjacent to the recess a cup-engaging surface diverging from the exterior of the delivery member toward the bottom of the recess.

7. A dispensing apparatus comprising an article receiver, and a member for discharging articles therefrom, said member having surfaces for engaging an article to be discharged and for retaining articles in the receiver respectively, one of said surfaces being a wedging or cam surface.

8. A dispensing apparatus comprising a cup receiver for holding a stack of nested cups, means to exert a force longitudinally of the receiver for withdrawing a cup from the stack of nested cups therein, and means for inverting the withdrawn cup.

9. A dispensing apparatus comprising a receiver for holding a stack of nested cups, and means for effecting relative movement between the cup stack and a terminal cup in a direction longitudinally of the cup stack to free the terminal cup from the stack.

10. A dispensing apparatus comprising a receiver for holding a stack of nested cups, means for effecting relative movement between the cup stack and a terminal cup in a direction longitudinally of the cup stack to free the terminal cup from the stack, and a delivery member for receiving the cup freed from the stack.

11. A dispensing apparatus comprising means for holding a stack of nested cups in substantially vertical position with the open ends of the cups downward, and means for effecting relative movement between the cup stack and the bottom cup thereof in a direction longitudinally of the cup stack to free said bottom cup from the stack.

12. A dispensing apparatus comprising means for holding a stack of nested cups in substantially vertical position with the open ends of the cups downward, means for effecting relative movement between the cup stack and the bottom cup thereof in a direction longitudinally of the cup stack to free said bottom cup from the stack, and a delivery member for receiving said bottom cup and inverting the same.

13. A dispensing apparatus comprising means for holding a stack of nested cups in substantially vertical position with the open ends of the cups downward, means for effecting relative movement between the cup stack and the bottom cup thereof in a direction longitudinally of the cup stack to free said bottom cup from the stack, and a delivery member having a pocket into which said bottom cup drops.

14. A dispensing apparatus comprising means for holding a stack of nested cups in substantially vertical position with the open ends of the cups downward, means for effecting relative movement between the cup stack and the bottom cup thereof in a direction longitudinally of the cup stack to free said bottom cup from the stack, and a delivery member having a cup holding projection upon which said cup falls.

15. A dispensing apparatus comprising means for holding a stack of nested cups in substantially vertical position with the open ends of the cups downward, means for effecting relative movement between the cup stack and the bottom cup thereof in a direction longitudinally of the cup stack to free said bottom cup from the stack, a delivery member having a cup holding projection upon which said cup falls and means for inverting said delivery member.

16. The combination with a cup-receiver, of a movable delivery member provided with a cup-recess, and means movable with the delivery member for drawing a cup from the receiver into the recess.

17. A dispensing apparatus comprising means for holding a stack of nested cups in substantially vertical position, a delivery member mounted to rotate about a horizontal axis beneath said stack and having a cup receiving pocket therein movable into and out of a position under said stack, and means for dropping the bottom cup into said pocket while supporting the remainder of the stack above the level of the mouth of said pocket.

18. A dispensing apparatus comprising means for holding a stack of nested cups in substantially vertical position with the open ends of the cups downward, a delivery member having a cup holding projection movable into and out of a position beneath said stack, means for dropping the bottom cup of the stack upon said projection and means for supporting the remainder of said stack above and out of the line of movement of said projection and the cup thereon.

19. A dispensing apparatus comprising an article-receiver, and a delivery member provided with diverging article-supporting and article-withdrawing surfaces.

20. An apparatus for feeding articles provided with projections comprising a receiver for a series of said articles, and a device having diverging surfaces one of which coöperates with the projection of a terminal article and another of which coöperates with the succeeding article whereby said terminal article is withdrawn from the series.

21. An apparatus for feeding articles provided with projections comprising a receiver for a series of said articles, and a rotatable device having a surface concentric to the center of rotation and against which the terminal article normally rests and an eccentric surface for engagement with a projection of said terminal article.

22. A dispensing apparatus for cups comprising a receiver adapted to hold a series of cups with their open ends down, and a movable member having an interrupted surface against which the open end of the terminal cup normally rests and a supporting surface movable into engagement with the next to the terminal cup before the interruption in said first surface reaches the terminal cup and permits the same to be discharged from the series.

23. An apparatus for feeding cups provided with flanges comprising a receiver for a series of said cups, and a rotatable delivery drum having a surface for supporting the series and a separating groove which a cup-flange enters in the rotation of the drum.

24. An apparatus comprising a receiver for a series of cups, each cup having its opening turned downward in the receiver, a delivery device with which the lower cup of the series contacts, and engaging means carried by the delivery device whereby cups may be successively removed from the receiver and inverted for discharge.

25. In a dispensing apparatus, a casing, a tubular receiver carried by and projecting upwardly from said casing and communicating with the interior thereof, means in the casing for permitting the bottom cup of a series of nested cups contained within the receiver to drop into said casing, and a cup inverting device mounted in said casing.

26. In a dispensing apparatus, a casing, a tubular receiver carried by and projecting upwardly from said casing, means in the casing for supporting a series of nested cups with their open ends turned downward within said receiver and for permitting said cups to drop one at a time into said casing, a discharge opening in said casing and a movable delivery device in said casing for receiving the cups as dropped from the receiver, inverting the same and presenting them at said discharge opening.

27. In a dispensing apparatus the combination of a casing having a supply opening in the top thereof and a delivery opening in the lower part of the casing, a tubular receiver for holding a stack of nested cups removably mounted upon the casing above said supply opening, means for locking said receiver to the casing, means within the casing for separating the terminal cup from the stack and for supporting the remainder of the stack, and an oscillating delivery member mounted in the casing adapted to receive the terminal cup when separated from the stack and to deliver the same to the delivery opening of the casing.

28. In a dispensing apparatus the combination of a receiver for holding a stack of cups, a casing upon which said receiver is mounted, said casing having a delivery opening therein, a closure for said delivery opening mounted within said casing, means mounted in said casing for separating the terminal cup from said stack and a common operating handle for operating said cup separating means and for temporarily opening said closure.

29. In a vending-machine wherein cups are successively taken from a pile and conveyed to a cup-support, the combination of means for supporting a pile of inverted cups, an oscillating member having an inverted cup-receiver and having means for removing the lowermost cup from the pile, permitting it to fall upon said cup-receiver by gravity when said member is turned in one direction, said means being movable to permit said cup to fall upon the cup-support by gravity when said member is turned in the opposite direction and the position of the cup-receiver thereby reversed, substantially as described.

30. In a vending-machine, wherein cups are successively taken from a pile and conveyed to a cup-support, the combination of means for supporting a pile of inverted cups, an oscillating member having an inverted cup-receiver, and having lip-engaging means for engaging the lip of the lowermost cup of the pile and for withdrawing said cup from the pile, permitting it to fall by gravity upon the cup-receiver when said member is turned in one direction, and for permitting said cup to fall by gravity upon the cup-support when said member is turned in the opposite direction and the position of the cup-receiver is reversed, substantially as described.

31. In a vending-machine wherein cups are successively taken from a pile and conveyed to a cup-support, the combination of means for supporting a pile of inverted cups, an oscillating member having an inverted cup-receiver which, when turned in one direction and the position of the cup-receiver reversed, permits a cup thereon to fall by gravity upon the cup-support, and when returned to its normal position, removes the lowermost cup from the pile, permitting it to fall by gravity upon the cup-receiver, substantially as described.

32. In a vending-machine, the combination of means for supporting a pile of inverted cups, an oscillating member having a cup-receiver consisting of a tubular portion having radially extended wings made tapering in the direction of their length, and having means for removing the lowermost cup from the pile, which permits it to fall upon said receiver, substantially as described.

33. In a dispensing apparatus for cups, the combination of means for retaining a stack of nested cups in substantially vertical position with the open ends of the cups downward and a supporting device for said stack upon which the open end of the terminal cup is adapted to rest, said supporting device being movable to permit the bottom cup of the stack to drop therefrom while supporting the remaining cups.

34. In a dispensing apparatus for nested cups, the combination of a receiver for holding a stack of cups in a substantially vertical position, and a movable supporting device for the stack adapted to be engaged successively with the exposed portions of intermediate cups of the stack and to separate and release successively the terminal cup or cups of the stack to permit the same to fall by gravity away from the stack.

35. A dispensing apparatus comprising a receiver adapted to hold a series of nested articles, a supporting device for the series adapted to engage an exposed portion of an intermediate article of the series while a terminal article is removed from the series, and means for withdrawing the terminal article.

36. In a dispensing apparatus for nested cups, the combination of two supports for a stack of cups, one adapted to engage the exposed portion of an intermediate cup of the stack and one adapted to engage the terminal cup of the stack, means for rendering said supports alternatively operative, and means for loosening the terminal cup from the stack.

37. In a dispensing apparatus the combination of a receiver for holding a stack of nested flanged cups and a rotary wedging device adapted to engage the flanges of adjacent cups to separate said cups.

38. In a dispensing apparatus for nested cups, the combination of a receiver for a stack of cups and means for loosening a cup from the stack, said means engaging said cup at a plurality of circumferentially spaced positions.

39. In dispensing apparatus for nested cups, the combination of a receiver for a stack of cups, and means for effecting relative longitudinal movement between the stack and a terminal cup thereof, said means engaging said terminal cup and an intermediate cup of the stack at a plurality of circumferentially spaced positions on said cups.

40. In a dispensing apparatus for nested flanged cups, the combination of a receiver for a stack of such cups, and means for separating a terminal cup from the stack having surfaces engaging the cup flanges at a plurality of circumferentially spaced positions.

41. In dispensing apparatus for nested flanged cups, the combination of a receiver for a stack of such cups, and a plurality of wedging members movable between the flanges of adjacent cups at circumferentially spaced positions for separating said cups in a direction longitudinally of the stack.

42. In dispensing apparatus for nested articles, the combination of a receiver for a stack of articles, means for releasing a terminal article while supporting the rest of the series, and means for striking a blow upon the released terminal article to loosen the same from the stack.

43. In a dispensing apparatus for nested cups, the combination of a receiver for holding a stack of cups in a substantially vertical position, and a movable supporting device for the stack adapted to be engaged successively with the exposed portions of intermediate cups of the stack and to release successively the terminal cup or cups of the stack to permit the same to fall by gravity away from the stack, and a delivery member adapted to engage said cups and invert the same.

44. In dispensing apparatus, the combination of a receiver for holding a stack of articles in substantially vertical position, an oscillating member mounted under said stack and having a curved article supporting surface interrupted by an article receiving pocket, a wedging device adapted to be inserted between the exposed portions of the terminal and next succeeding article of the stack to separate the terminal article from the stack and permit the same to rest upon the curved article supporting surface, and means independent of said surface for supporting the stack during the movement of the delivery member into a position to receive said terminal article within the pocket thereof.

45. In dispensing apparatus, the combination of means for holding a stack of articles, a delivery member, means for moving the delivery member to deliver an article contained therein, means for separating a second article from the stack during the movement of the delivery member, and means for supporting said second article until the delivery member has moved to a position to receive said article.

46. In dispensing apparatus, the combination of a receiver for holding a stack of articles, a delivery member having an article pocket therein, said delivery member normally occupying a position with said pocket in position to receive an article discharged from said receiver, means for moving said delivery member to deliver an article contained in said pocket, means operatively associated with said delivery member for releasing a second article from said stack, and means for supporting said second article until the delivery member returns to its normal position.

47. In dispensing apparatus, the combination of a receiver for holding a stack of articles, a delivery member having a curved supporting surface interrupted by an article pocket, means for releasing an article from said stack, and a common operating device for operating said delivery member to discharge an article contained in the pocket therein and for releasing an article from said stack, said last-named article being supported by the curved surface of said delivery member while the same is moving to a position to receive said article in its pocket.

48. In cup dispensing apparatus, the combination of a casing having a discharge opening, means within the casing for delivering a cup at the discharge opening, and means for releasably supporting the cup with its open end within the discharge opening and its closed end projecting through the discharge opening into an accessible position.

49. In cup dispensing apparatus, the combination of a casing, a receiver communicating with the casing and adapted to hold a stack of cups with their open ends downward, said casing having a delivery opening, a delivery member mounted in the casing and adapted to receive a cup from said stack, invert the same and present said cup at said delivery opening, and means for releasably holding said cup with its open end within said delivery opening and its closed end projecting through said opening to an accessible position.

50. In cup dispensing apparatus, the combination of a casing having a delivery opening, a rotary drum mounted within the casing and provided with cup carrying means adapted to deliver a cup at said delivery opening, and means for releasably holding a cup partly within said delivery opening and partly projecting therefrom.

51. In cup dispensing apparatus, the combination of a casing having a delivery opening, cup delivery means mounted within the casing, and means for releasably supporting a cup delivered by said delivery means partly within said delivery opening.

52. In dispensing apparatus for flanged cups, the combination of a casing having a delivery opening, cup delivery means within said casing, and means releasably engaging the cup flanges for supporting said cup when delivered by said delivery means.

53. In dispensing apparatus for flanged cups, the combination of a casing having supply and delivery openings therein, a cup receiver mounted upon said casing above said supply opening and adapted to hold a series of flanged cups in nested relation, cup delivery means within said casing adapted to deliver cups at said delivery opening, and means for temporarily retaining said cups partly within said delivery opening.

54. In dispensing apparatus for flanged cups, the combination of a casing having supply and delivery openings therein, a cup receiver mounted upon said casing above said supply opening and adapted to hold a series of flanged cups in nested relation, a rotary drum mounted within said casing having a cup receiving pocket therein, means for rotating said drum to present a cup in said pocket at the delivery opening in the casing, and means engaging the flanges of said cup for temporarily retaining the mouth of the cup within said delivery opening.

Signed at New York (borough of Manhattan), in the county and State of New York, this 19th day of November, 1909.

LAWRENCE W. LUELLEN.

Witnesses:
Louis S. Begent,
John M. Coleman.